United States Patent [19]

Sprick

[11] 3,910,600

[45] Oct. 7, 1975

[54] BICYCLE FORK CROWN
[75] Inventor: Julius Sprick, Auf der Benkert, Germany
[73] Assignee: Firma Julius Sprick KG, Germany
[22] Filed: Apr. 29, 1974
[21] Appl. No.: 464,925

[30] Foreign Application Priority Data
May 24, 1973   Germany............................ 2326504

[52] U.S. Cl. .............................................. 280/280
[51] Int. Cl.² .................... B62K 19/20; B62K 21/04
[58] Field of Search............................. 280/280, 279

[56] References Cited
UNITED STATES PATENTS
535,145   3/1895   Perkins .............................. 280/280
2,968,493   1/1961   Douglas ............................. 280/280

FOREIGN PATENTS OR APPLICATIONS
25,341   11/1897   United Kingdom................. 280/280
6,635   2/1895   United Kingdom................. 280/280
13,020   5/1897   United Kingdom................. 280/280

Primary Examiner—David Schonberg
Assistant Examiner—John P. Silverstrim
Attorney, Agent, or Firm—Charles E. Baxley, Esquire

[57]   ABSTRACT

The present invention relates to a fork crown for a bicycle fork having a central receiving opening for a head tube and lateral receiving openings for fork blades.

6 Claims, 4 Drawing Figures

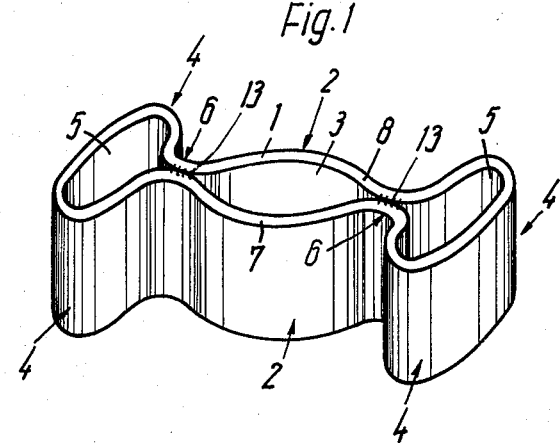
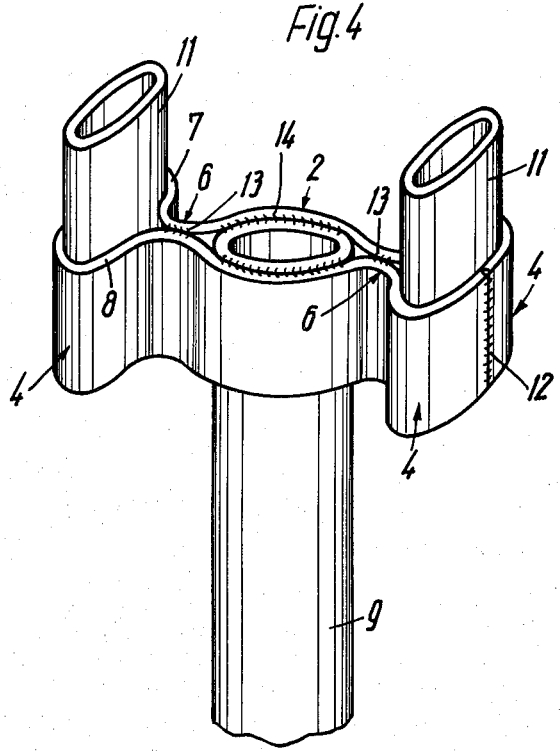

BICYCLE FORK CROWN

BACKGROUND OF INVENTION

Known fork crowns of this type generally are made of malleable cast iron. A head tube and fork blades are soldered into corresponding receiving openings of the casting. This connection between the fork blades and the head tube is extremely rigid because the malleable cast iron structure has little elasticity. Naturally, the solder points can also not be elastic. Cracks are readily produced on the malleable cast iron crown on the one hand due to peak loads and on the other hand to gradual fatigue of the material, and during the course of time these cracks lead to a break in the bicycle forks. Not only lower strength due to single piece rigid design but also high cost of manufacture of such cast crowns are particularly disadvantageous.

Crowns drawn from relatively thin metal sheet are also known. Such a shaped part is teemed with solder after insertion of the fork blades and the head tube, whereby a substantially rigid connection is also obtained between the fork blades and the head tube. The enormous amount of solder which is required in order to fill all spaces between the sheet metal part, the fork blades and the head tube constitutes a particular disadvantage of this embodiment.

STATEMENT OF INVENTION

The object of the present invention is to create a fork crown which differs entirely from the known principles, which is on the one hand extremely cheap to manufacture and, on the other hand, is of particularly high strength as a result of its elasticity. This object is achieved according to this invention in a fork crown of this type by means of a flat metal band with front half and rear half bulged to form mirror images of each other, which halves together completely surround a central receiving opening for the head tube and from then on each form an arm extending diametrically outward and then widen in the form of a loop to provide openings for receiving the fork blades. The front half and the rear half of the metal band can advantageously consist of a single deformed ring. In this connection it is advantageous for streamlined manufacture if the receiving ends of the head tube and/or the fork blades are at the same time compressed by the annular metal band.

In another advantageous embodiment according to the invention, the front half and the rear half of the metal band consist of separate shaped parts and are connected to each other. For the connecting of the head tube to the metal band the front half and the rear half may advantageously be welded at their lower narrow sides to the head tube which is inserted flush with same into the central receiving opening.

An advantageous manner of attachment of the fork blades to the metal band results from welding the front half and the rear half at their abutting seam on the outside of lateral receiving openings to each other and at the same time to inserted fork blades. The connecting of the halves of the metal band can in addition be effected in advantageous manner by welding the front half and the rear half butt to each other in the region of contact of the arms. Furthermore, it is of particular advantage from a manufacturing standpoint if the saddle ring on the head tube, which is required for supporting of the fork, is inserted into the receiving opening of said tube and is welded to the front half and the rear half. In this connection it is advantageous if the weld seam on the arms which extend approximately diametrically to the insertion opening for the head tube is continued to over the saddle ring.

Particularly simple production of the metal band can be achieved advantageously by having its front half and its rear half consist of strip iron. In this connection a great advantage can be obtained by strengthening the strip iron by cold working.

DESCRIPTION OF DRAWINGS

The invention will be explained in further detail below with reference to an illustrative embodiment shown in the drawing in which like numerals designate like parts and wherein:

FIG. 1 is a perspective view of a fork crown developed in accordance with this invention.

FIG. 4 is a perspective view of the bicycle fork of FIG. 3 in the region of the fork crown, seen from the bottom.

DETAILED DESCRIPTION OF PREFERRED EMBODIMENTS

Figure 2:
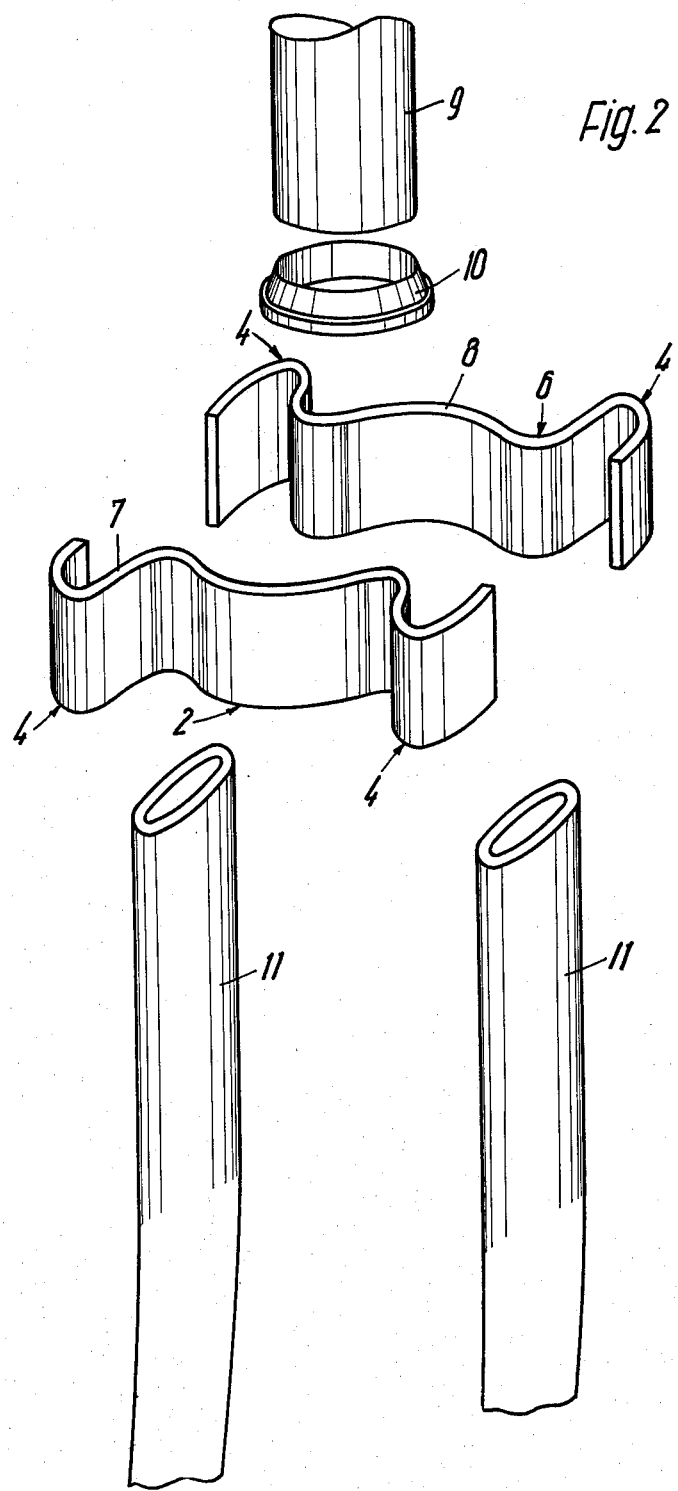
FIG. 2 shows a bicycle fork in exploded perspective view in the region of the fork crown which is formed in accordance with this invention of two halves.

FIG. 1 shows the basic construction of a fork crown in accordance with this invention. The fork crown is comprised of a metal band 1 which while flat is sufficiently strong that the forces to be transmitted by the fork crown can be handled. The predominant portion of the strength of the metal band 1 furthermore is provided by its height by varying of which there is further possibility of determining the strength of the fork crown.

The metal band 1 consists either of an originally endless ring or is assembled to form an endless structure out of two or more parts. The metal band 1 is bulged approximately the mirror image in the longitudinal direction of the fork crown and thus also it its own longitudinal or circumferential direction. A front half 7 and a rear half 8 of the metal band 1 each in this way has a central bulge 2 in order to form a central receiving opening 3 for the head tube. Ordinarily, this head tube is of circular cross section so that the bulgings 2 of the front half 7 and the rear half 8 must also supplement each other so as to form a circular rim for the receiving opening 3.

The front half 7 and the rear half 8 of the metal band 1 join each other again approximately diametrically to the opening 3 so as from then on extending parallel towards the outside each to form an arm 6. Because the metal band 1, both when developed from an endless piece and when assembled from two halves, at first merely contacts itself in the region of the arms 6, it is of particular advantage for strengthening of the crown head if the two sections of the metal band which form the arms 6 are welded together. This can be done either by a weld seam 13 applied at the top or bottom to the narrow sides of the metal band 1 or by butt welding over the contact surfaces.

The arms 6 need not be arranged exactly diametrically to the central receiving opening 3. They can also be at an obtuse angle to each other, for instance in order to impart forward or backward caster to the wheel. One can then no longer speak of a precise mirror image development of the front half 7 and the rear half 8.

Adjoining the constricted region of the arms 6 the front half 7 and the rear half 8 of the metal band 1 have end bulges 4 in order to form the lateral receiving openings 5 of the fork crown for the fork blades. The bulges 4 of the metal band 1 therefore supplement each other so that each forms a lateral loop. If the fork crown is composed of originally separate front half 7 and rear half 8, the joint can advisedly extend on the outside of said loop and parallel to its axis.

In the exploded view of FIG. 2 the divided development of the front half 7 and the rear half 8 is shown. The two halves 7 and 8 are identical shapes. They are merely located as mirror images to each other. Therefore only a single tool is necessary for these shaped parts.

If the fork crown is made from an annular metal band it is then possible in a suitable tool to effect simultaneously the shaping of the metal band 1 and the pressing of it around the corresponding ends of the fork blades and the head tube. It is merely necessary by the insertion of suitable cores to see to it, for instance, that the fork blades which are customarily developed as tubes and the head tube are not squeezed out of shape.

In the case of two part construction, the halves 7 and 8 of the fork crown are welded for instance in two operations not only to each other but also to corresponding ends of the fork blades and the head tube. The connecting of the parts shown in exploded view in FIG. 2 can be clearly noted from FIGS. 3 and 4.

Figure 3:
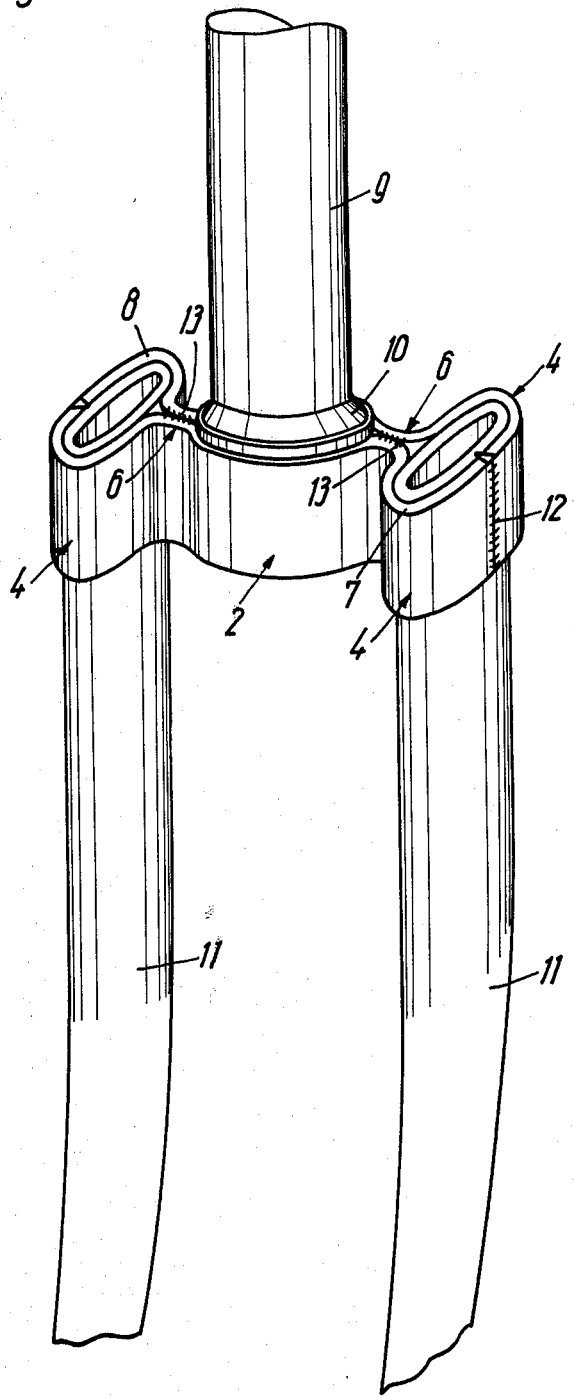
FIG. 3 shows in the same perspective view as FIG. 2, a bicycle fork equipped with the fork crown in accordance with this invention, seen from above.

In the top view given in FIG. 3 it can be seen how the fork tube 9, together with a saddle ring 10, which is necessary for the supporting of the bicycle fork, is seated in the central receiving opening of the fork crown. The weld seam 13 is passed from the arms 6 up to the collar of the saddle ring 10 so that the latter is also dependably secured in one operation.

The connection of the head tube 9 to the front half 7 and the rear half 8 is shown in FIG. 4. The end of the head tube 9 preferably terminates flush with the bottom of the front half 7 and the rear half 8. By means of an annular seam 14 the head tube 9 is firmly welded to the two fork crown halves 7 and 8. In this connection it is no longer necessary also to weld the head tube 9 on the top of the fork crown halves 7 and 8. Rather, as already mentioned, the saddle ring 10 is welded in place there.

One particularly suitable manner of fastening the fork blades 11 is shown in FIG. 3. The front half 7 and the rear half 8 of the fork crown are not only welded to each other at the lateral joints 12 but are also simultaneously welded to the ends of the fork blades 11. After the insertion of the ends of the fork blades 11 into the lateral receiving openings 5, one can in a single operation weld along the joint 12 up onto the fork blades 11. This connection is as a rule sufficient and one can normally dispense with the welding of the ends of the fork blades 11 to the top of the fork crown halves 7 and 8.

Strip iron is preferred as material for the metal band 1. It cannot only be welded without difficulty but in addition also offers such elasticity that a slight but sufficient inherent elasticity of the fork crown is present. As a result of this the fork crown has an extremely long fatigue life. It is furthermore a special advantage that the strength can be considerably increased by the cold working of the fork crown parts.

The advantages indicated are also obtained when an annular endless band 1 is used for the production of the fork crown. Because in this case the seam 12 is absent, the fork blades are welded advisedly at their ends to the upper narrow sides of the band 1. The welding in place of the head tube 9 is effected in the same manner as in the case of divided fork crown halves. In this embodiment also the weld seams 13 can pass advantageously along the bottom of the arms 6 into the annular seam 14.

I claim:

1. A fork crown for bicycle forks including a head tube and a pair of fork blades, said crown comprising a waved metal band having a front half and a rear half which halves are bulged so as to form mirror images of each other and which halves together completely surround a central receiving opening for said head tube each of said halves extending from said central receiving opening outwardly diametrically to form loops providing lateral receiving openings for said fork blades, said halves being formed of separate, shaped strip iron parts, said parts being connected together and to the fork blades by weld seams at the lateral ends of said parts, and said parts being connected together by weld seams between said central receiving opening and said lateral openings.

2. The fork crown according to claim 1, characterized further in that a weld seam at the bottom sides of the front half and the rear half is conducted along a wall of the head tube being inserted in the central receiving opening.

3. The fork crown according to claim 2, characterized further in that the head tube is inserted flush with the bottom sides of the front half and the rear half and that the weld seam at these bottom sides is conducted along a front edge of the head tube.

4. The fork crown according to claim 3, characterized further in that a saddle ring on the head tube is inserted in the receiving opening of said tube and is welded together to the front half and the rear half.

5. The fork crown according to claim 4, characterized further in that the head tube weld seam is conducted along the arms to over the saddle ring.

6. The fork crown according to claim 5, characterized further in that the strip iron is strengthened by cold working.

* * * * *